May 6, 1947.  E. W. AUSTIN  2,420,027
EARTH-WORKING IMPLEMENT
Filed Aug. 5, 1944  6 Sheets-Sheet 1

Inventor:
Ellsworth W. Austin.
By Thiess, Olsen & Mecklenburger.
Attorneys.

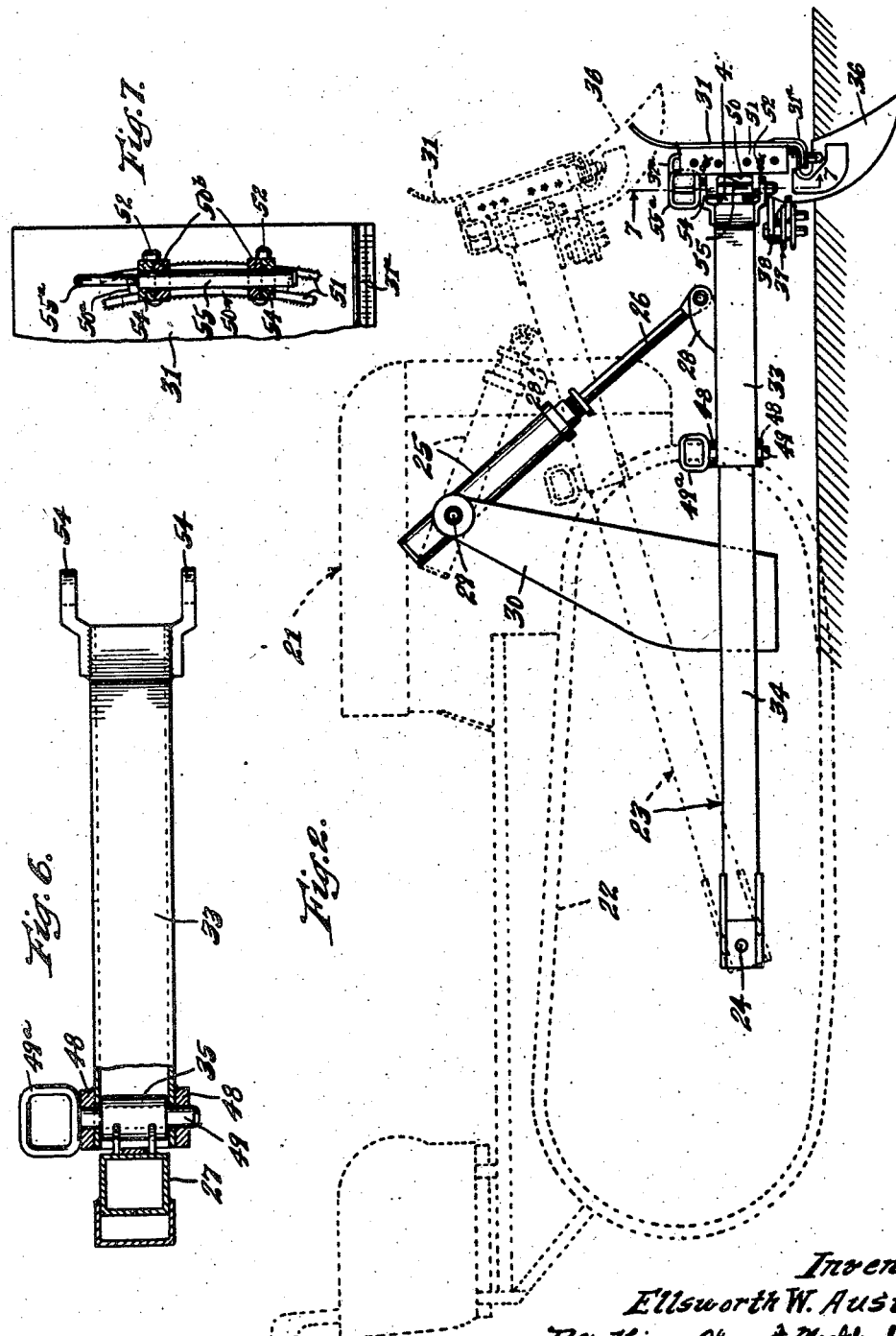

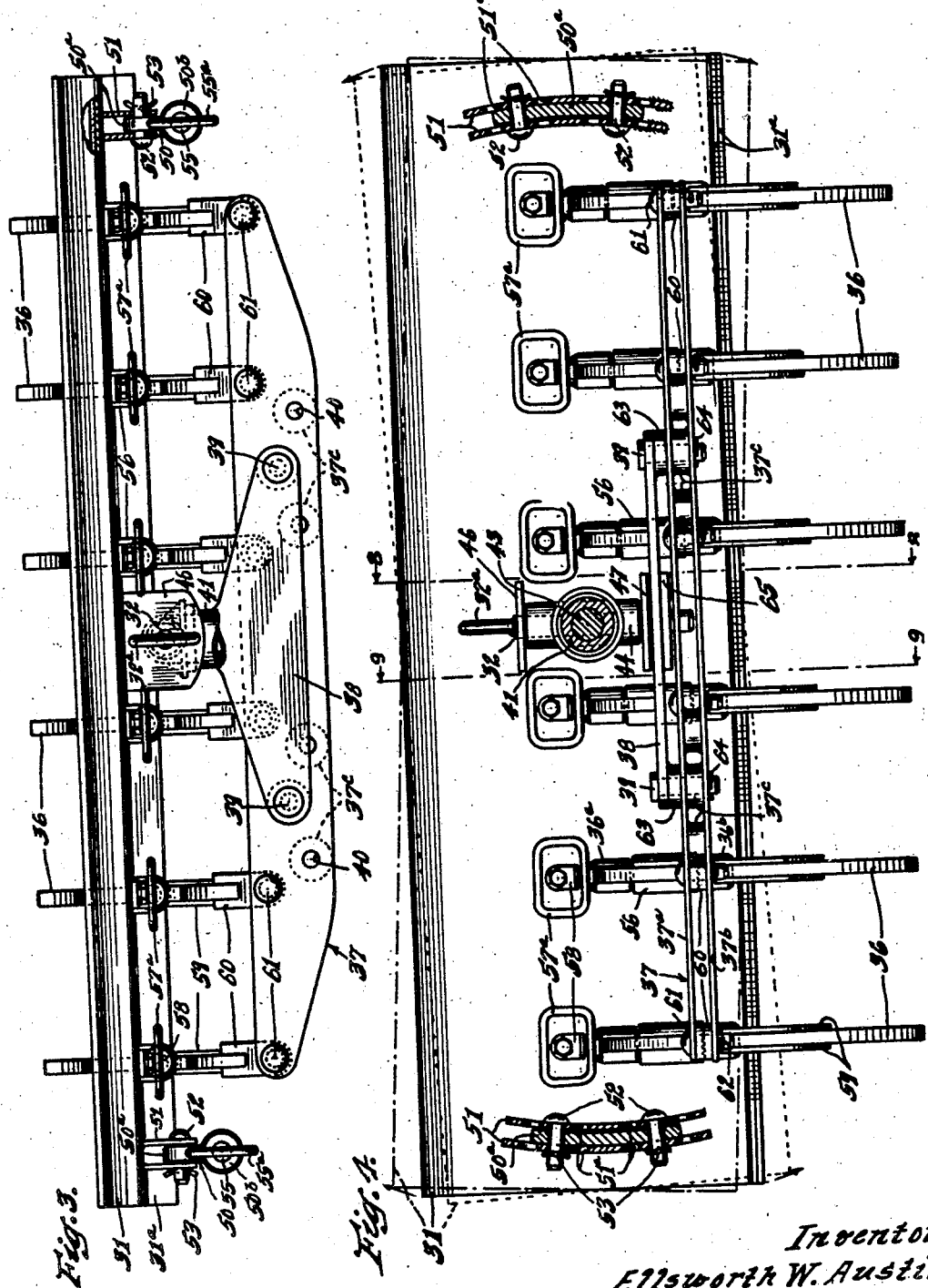

May 6, 1947.　　　　E. W. AUSTIN　　　2,420,027
EARTH-WORKING IMPLEMENT
Filed Aug. 5, 1944　　　　6 Sheets-Sheet 4
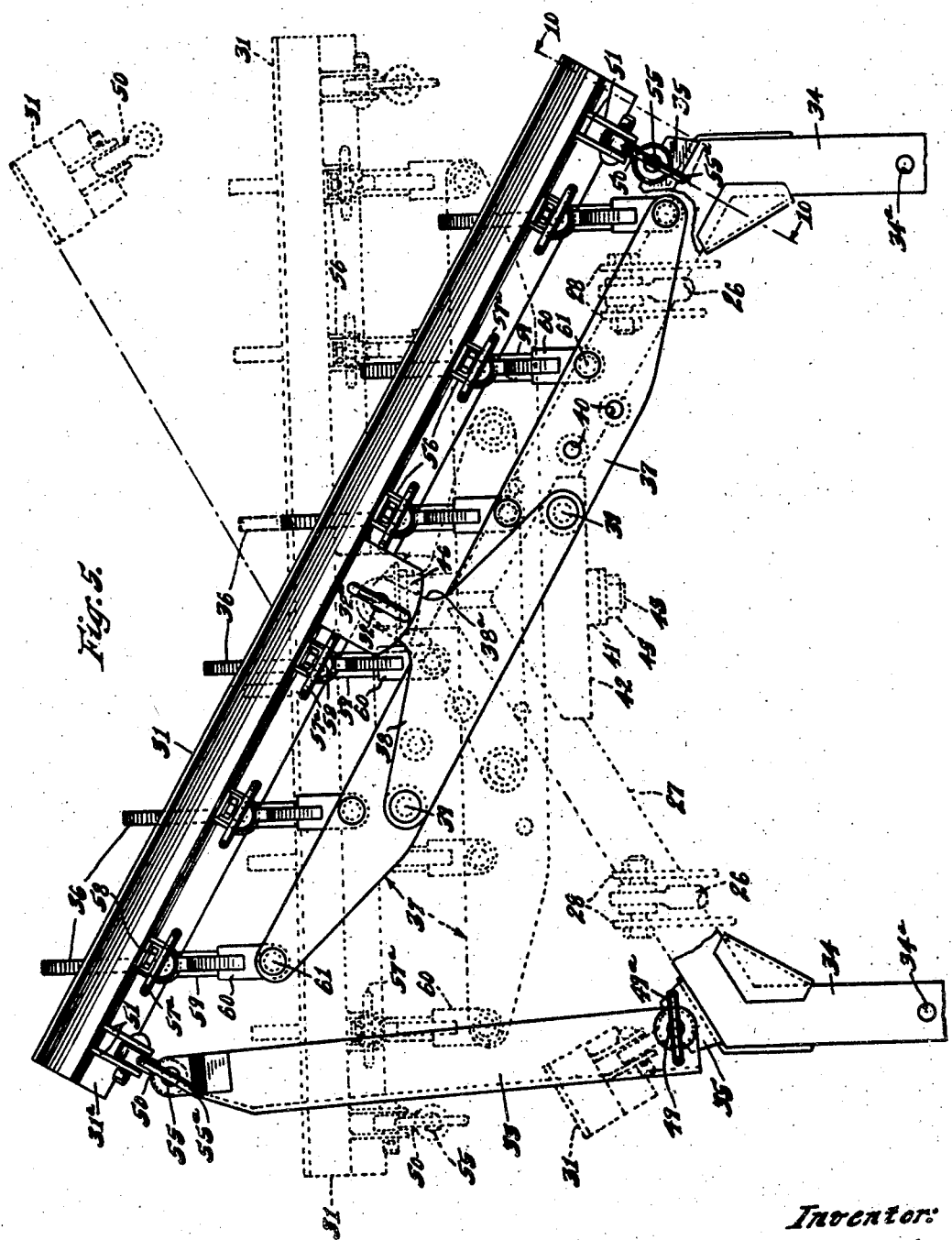
Inventor:
Ellsworth W. Austin,
By Kiess, Alan & Mecklenburger.
Attorneys:

May 6, 1947.  E. W. AUSTIN  2,420,027
EARTH-WORKING IMPLEMENT
Filed Aug. 5, 1944  6 Sheets-Sheet 5
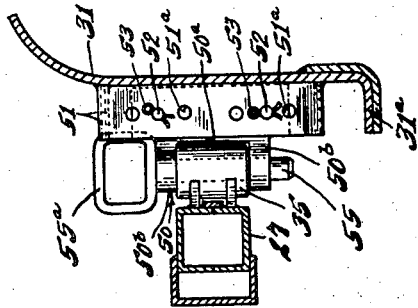
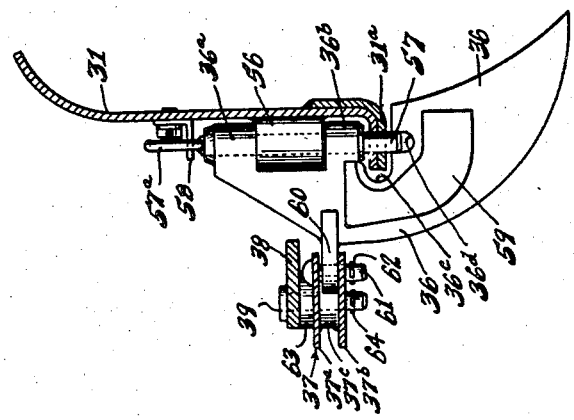
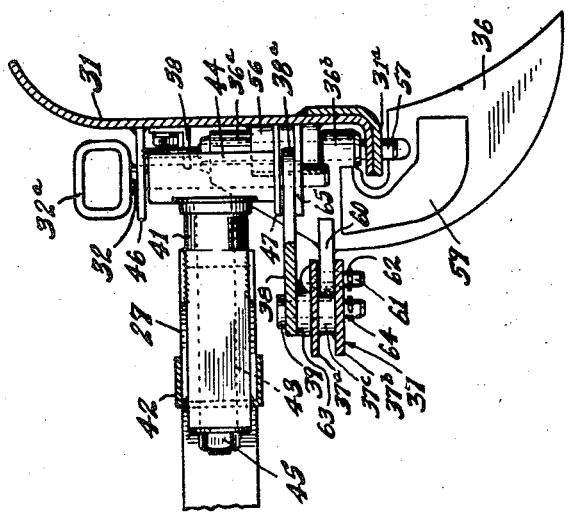
Inventor:
Ellsworth W. Austin,
By Thiess, Olson & Mecklenburger
Attorneys.

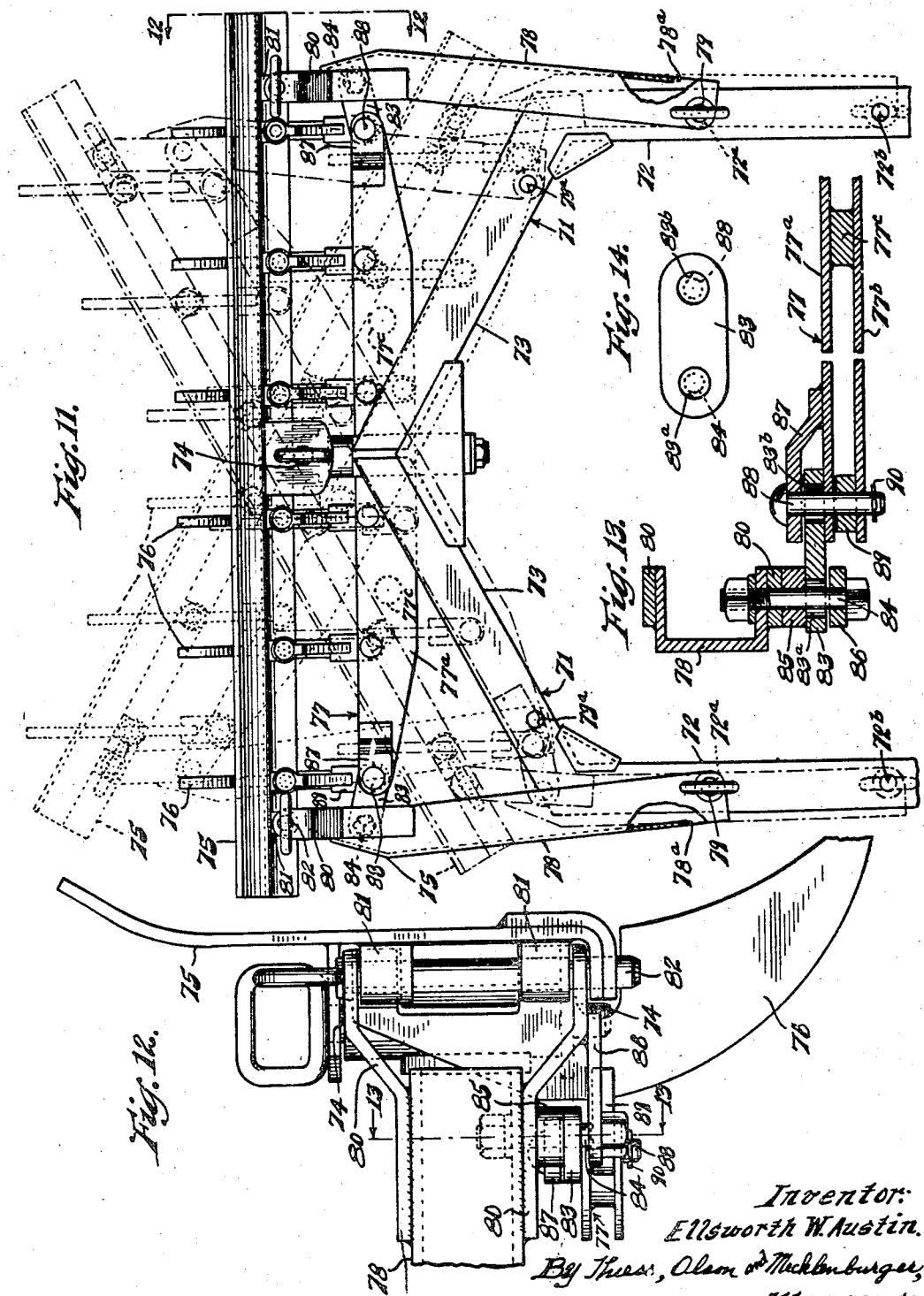

Patented May 6, 1947

2,420,027

UNITED STATES PATENT OFFICE 2,420,027

EARTH-WORKING IMPLEMENT

Ellsworth W. Austin, Cedar Rapids, Iowa, assignor to La Plant-Choate Mfg. Co., Inc., Cedar Rapids, Iowa, a corporation of Delaware Application August 5, 1944, Serial No. 548,265

19 Claims. (Cl. 37—145)

1

This invention relates to earth-working implements and has particular relation to implements of the type which may be built as attachments for tractors or other propelling vehicles or devices.

More particularly, the invention relates to an implement for moving earth or other material and at the same time scarifying or otherwise loosening or breaking up the material to be moved.

Earth-moving implements such as bulldozers and the like are commonly provided with blades or mold boards which may be adjusted to various angular positions with respect to the direction in which the implement is to be moved, such adjustability being accomplished, for example, by mounting the blade or mold board for pivotal movement about an axis which may be perpendicular or approximately perpendicular to the ground when the implement is in a normal working position. Adjustments of this nature are utilized to provide for side-casting of the earth or other material to be moved and in general to accomplish the desired type of movement of material. In some cases, however, the blade or mold board is used in a position in which the transverse elements of its surface are perpendicular to the direction of movement.

For certain operations it is desirable to utilize, in connection with a bulldozer type of blade or mold board, a number of rake teeth or the like for scarifying or otherwise loosening or breaking up the earth or other material to be moved. Such rake teeth are preferably relatively thin in order that they may cut through a layer of earth of substantial depth as the implement is moved along the surface to be worked, without encountering excessive resistance to such movement. For purposes of strength and rigidity, however, such rake teeth must be of considerable extent in their dimensions parallel to the normal direction of movement thereof, so that they are preferably made in the form of relatively thin, flat claws.

Efforts have been made heretofore to produce implements combining bulldozer blades or mold boards with rake teeth, but such devices have not produced satisfactory results because their construction has been such that angular adjustments of the mold board transverse to the direction of movement of the implement has caused corresponding angular changes in the positions of the rake teeth, so that the longitudinal dimensions thereof are thrown out of parallelism with the direction of movement of the implement. In a device of such construction and adjustment the rake teeth are so positioned that they must be pushed through the earth in a direction at an angle to the broad surfaces thereof, whereby excessive resistance to movement is encountered, with resultant excessive stresses on the parts and difficulty in operation. Consequently, such combination implements have not been considered practicable heretofore.

2

The principal object of the present invention is to provide an implement combining a bulldozer blade and a series of rake teeth which will function satisfactorily in conjunction therewith.

More specifically, it is an object of the invention to provide an implement of the above-identified character wherein the rake teeth are carried by the bulldozer blade or mold board and are mounted thereon for pivotal movement about axes which are substantially perpendicular to the surface of the earth or other material being worked upon, so that they may be adjusted to substantial parallelism of their flatwise dimensions with the direction of movement, independently of the transverse angular adjustment of the bulldozer blade or mold board.

A further object of the invention is to provide an implement of the above-indicated character in which the said angular adjustment of the rake teeth is effected automatically in all operating positions of the bulldozer blade or mold board.

A further object is to provide an implement of the above-indicated character which shall be relatively simple and economical to construct and easy to operate and yet be rugged and reliable in its operation.

The invention will be better understood and other objects and advantages thereof will appear from a consideration of the following detailed description in conjunction with the accompanying drawings, in which Figure 1 is a top plan view of a construction constituting a preferred embodiment of the invention, in the form of an implement to be used as an attachment for a tractor or the like, the general outlines of the latter being shown in broken lines with the said attachment disposed in operative relation thereto;

Fig. 2 is a side elevational view of the same construction with the general outlines of the tractor again shown in broken lines and with the attachment shown in full lines in normal operative position and in dotted lines in a raised position in which it may be placed when it is not in use and when the entire machine is to be moved from one place of operation to another, etc.;

Fig. 3 is a top plan view, on a larger scale, of the forward portion of the attachment, embodying an assembly of a mold board and a series of rake teeth together with fragmentary portions of means for connecting such assembly to other parts of the construction, with certain details shown in section;

Fig. 4 is a rear elevational view of the assembly shown in Fig. 3, with certain of the connecting parts shown in section, all parts being shown in full lines in normal or neutral positions and the outline of the mold board being shown in dotted and dot-and-dash lines, respectively, in two angled positions to which it may be adjusted about the longitudinal axis of the entire implement;

Figure 1:
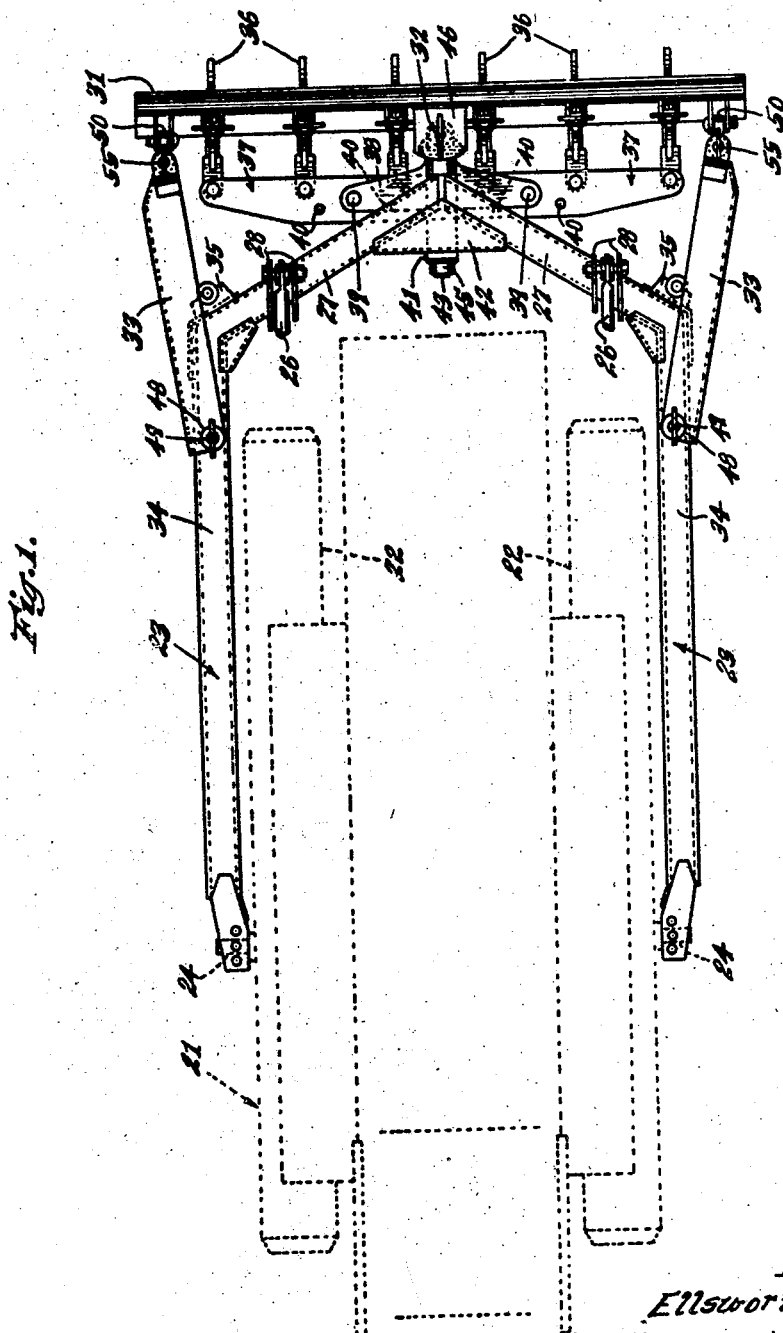

Fig. 5 is a top plan view of the forward portion of the implement, including the assembly shown in Fig. 3 and also certain parts of the frame structure and connecting parts, the said assembly being shown in full lines and in an angled position to which it may be adjusted and in dotted lines in a normal or neutral position and the extremities thereof being also shown in dotted lines in another angled position, and the frame structure and connecting parts being partly broken away and partly shown in broken outline for greater clarity of illustration;

Fig. 6 is a detail view of a push pole or beam and certain associated parts included in the construction shown particularly in Figs. 1 and 2, but on a larger scale the same as that of Figs. 3, 4 and 5, this view being partly in side elevation and partly in vertical section, with certain portions broken away for better illustration;

Fig. 7 is a fragmentary view partly in elevation and partly in vertical section taken on the plane indicated by the line 7—7 in Fig. 2 but on the larger scale of Figs. 3–6;

Fig. 8 is a vertical sectional view taken on the plane indicated by the line 8—8 in Fig. 4;

Fig. 9 is a vertical sectional view taken on the plane indicated by the line 9—9 in Fig. 4;

Fig. 10 is a vertical sectional view taken on the planes indicated by the line 10—10 in Fig. 5;

Fig. 11 is a top plan view of a modified form of implement constituting another preferred embodiment of the invention, with the parts shown in full lines in a normal or neutral position and in dotted and dot-and-dash lines, respectively, in two other positions to which they may be adjusted;

Fig. 12 is a fragmentary end elevational view taken on the plane indicated by the line 12—12 in Fig. 11 but on a larger scale;

Fig. 13 is a fragmentary vertical sectional view taken on the plane indicated by the line 13—13 in Fig. 12; and Fig. 14 is a detail top plan view of a link included in the construction illustrated in Figs. 11, 12 and 13.

Referring to the drawings, Figs. 1 and 2 show in broken lines the general outlines of a tractor 21 which may be used to propel the implement or attachment embodying the invention. This tractor includes tracks 22 on the opposite sides thereof which are carried by roller frames (not shown) as is well known in the art. The implement or attachment embodying the invention comprises a frame member designated generally by the reference character 23 which is journaled on pivots 24 for pivotal movement about a horizontal axis extending transversely of the tractor, these pivots being carried by the above-mentioned track roller frames of the tractor in a manner which is well known in the art. The frame member 23 constitutes the main frame of the entire implement or attachment, which is bodily movable about the pivots 24 to different elevations, as illustrated, for example, by the positions illustrated in full lines and in dotted lines, respectively, in Fig. 2. The full line position illustrated in this figure is a normal working position, and the dotted line position is an elevated position to which the implement may be raised when it is to be transported with the tractor from one place of operation to another, or in general when it is not in use.

Movement of the implement about the pivots 24 is effected by means of hydraulic cylinders or jacks 25 having the usual pistons (not shown) and connecting rods 26 pivotally connected to forward portions 27 of the frame 23 by means of brackets 28 secured to said frame portions. The hydraulic cylinders 25 are journaled on pivots 29 supported by brackets 30 which, in turn, are preferably supported by the above-mentioned track roller frames but may, if desired, be supported directly by the tractor frame. The pivots 29 are mounted on a horizontal axis extending transversely of the tractor and thereby provide for pivotal movement of the cylinders 25 as the implement is bodily raised and lowered. Such movements are effected by hydraulic means acting through the cylinders 25 and associated pistons and connecting rods under the control of a suitable valve or valves in a manner well known in the art, means being provided on the tractor for supplying hydraulic fluid under pressure to accomplish these operations. The implement may be raised or lowered to any desired position within the limits of its movement and may be either locked or allowed to float with hydraulic support in that position. The full line position illustrated in Fig. 2 is a suitable working position, and the raised position illustrated in dotted lines in the same figure is a suitable non-operating position, but either of these positions may be either raised or lowered as desired.

The implement embodying the invention comprises a bulldozer blade or mold board 31, the principal portion of which may be so designed and constructed as to extend either substantially vertically, as shown, when the device is in a normal operating position, or may be tilted either forwardly or rearwardly. The mold board 31 and associated parts which will be referred to hereinafter constitute an assembly which is mounted for pivotal movement about a pin 32, the axis of which extends substantially perpendicularly to the general plane of the frame 23 and which may be substantially perpendicular to the ground when the implement is in a normal working position, as illustrated in Fig. 2. The pin 32 is carried by the frame 23, in a manner which will be described in more detail hereinafter, in a position on the longitudinal axis of the frame and slightly ahead of the forward extremity thereof, which comes to an apex at the juncture of the front frame portions 27.

The mold board assembly, when adjusted to a position extending transversely of the implement at right angles to the longitudinal axis thereof, as shown in Figs. 1 and 2, is further supported from the frame 23 by means of push poles or beams 33 extending from points of connection with frame side members 34 near the forward extremities thereof to points of connection with the mold board assembly near the opposite extremities thereof, which connections will be described in more detail hereinafter. The assembly is adjustable about the pivot 32 to either right or left angled positions, in either of which cases the rear extremity of the push pole or beam 33 on the side of the assembly which is to be moved forward is disconnected from the frame side member 34 and connected to a bracket 35 at the corresponding forward corner of the frame, and the beam on the other side of the assembly is removed and that end of the assembly is connected directly to the bracket member 35 on that side of the frame. The mold board assembly is shown in full lines in Fig. 5 in its position angled to the right in this manner, and the corresponding position angled to the left is indicated fragmentarily in broken lines in the same view.

Associated with the mold board 31 is a series of rake teeth 36, each of which is pivotally mounted on the mold board assembly about an axis which is substantially perpendicular to the ground line when the implement is in normal operating position. A connecting bar 37 extends transversely of the implement, parallel to the mold board 31, and is pivotally connected to a rearward extension of each of the rake teeth 36, whereby these teeth are maintained in parallelism with each other. A yoke member 38 is anchored on the main pivot pin 32 of the mold board assembly and has holes therethrough near its opposite extremities into which connecting pins 39 are inserted. Each of these pins extends through one of a series of holes 40 in the connecting bar 37, any one of which holes may be brought into register with the hole in the corresponding end of the yoke member 38, by movement of the connecting bar 37 to the right or left, as the case may be, when the connecting pins 39 are not in place. Such movement of the bar 37 with respect to the mold board 31 causes each of the rake teeth 36 to pivot about its mounting on the mold board assembly, so that the angular relation between each of the rake teeth and the mold board is varied.

In this manner the rake teeth may be adjusted to substantial parallelism with the longitudinal axis of the entire implement, in all transversely angled positions of the mold board, each of the holes 40 being so located along the bar 37 as to correspond to one of the transversely angled positions to which the mold board 31 may be adjusted. In other words, for any given adjustment of the mold board 31 about the pivot 32 one of the pin holes 40 in each series of such holes on opposite sides of the longitudinal axis of the implement will come into register with the pin hole in the corresponding end of the yoke member 38 when the bar 37 is adjusted to bring the rake teeth 36 into parallelism with the longitudinal axis of the implement. The pins 39 are then inserted through the holes in the yoke member 38 and extended through the registering holes 40 in the connecting bar 37 to lock the rake teeth in such adjustment. In the embodiment of the invention now under consideration these adjustments are made manually, the rake teeth being adjusted separately from the mold board.

In the normal operating position of the implement the rake teeth 36 penetrate the earth to a substantial depth below the ground line, as illustrated in Fig. 2, and are adapted to loosen or break up the earth or other material as the implement is propelled over the surface thereof, the bulldozer blade or mold board 31 serving to move the loosened surface layer of material forwardly or to cast it to one side or the other, depending upon the adjustment of the blade about the pivot 32.

Figs. 3–10 illustrate the above-described structure in greater detail. The mounting of the mold board and rake assembly on the frame 23 comprises a thrust sleeve 41 (Figs. 3, 4, 8) rigidly secured to said frame, as by welding, at the juncture of the front frame members 27, the axis of said sleeve coinciding with the longitudinal axis of the entire implement. A reinforcing member 42 (Figs. 1, 8) embraces the frame members 27 for a substantial distance on each side of the juncture thereof and is welded or otherwise rigidly secured thereto to add rigidity to the frame structure. The web of this reinforcing member is located at the rear side thereof and is apertured to receive the rear end of the thrust sleeve 41, which may be welded thereto for additional support and rigidity.

The bore of the sleeve 41 receives with a free fit a spindle 43 integrally formed with a pin-receiving sleeve 44 which is adapted to receive the main pivot pin 32 in proper fitting relation, the axis of its bore being perpendicular to that of the spindle 43. This spindle is held in place in the sleeve 41 by a nut 45 screwed onto the rear end thereof so that the pin-receiving sleeve 44 is firmly supported at the central forward extremity of the frame structure. The length of this sleeve is such that it may be received between two pin-bearing plates 46 and 47 (Figs. 3, 4, 8) which are welded to the rear surface of the blade or mold board 31 and extend rearwardly therefrom. These plates, like the sleeve 44, are bored to receive the pin 32 in proper fitting relation so that the assembly of the mold board and associated parts is pivotally mounted on said pin, which is provided at its upper extremity with a handle 32a to facilitate its removal and replacement in the assembly and disassembly of the apparatus.

The axis of this pivotal mounting may normally extend perpendicularly to the general plane of the frame 23, but if desired the spindle 43 may be rotated one way or the other in the sleeve 41 so that the entire assembly may be pivotally adjusted about the longitudinal axis of the implement. Two such angularly adjusted positions are indicated by way of example by the dotted and dot-and-dash outlines of the mold board 31 in Fig. 4. Such adjustments are utilized, of course, when it is desired that one end of the assembly be raised or lowered with respect to the other. To facilitate such adjustments the nut 45 is so adjusted on the spindle 43 as to allow the latter to turn in the sleeve 41, without having undue end play therein. The nut is made to have a snug threaded fit on the spindle so that it will stay in any position to which it is adjusted, and may be positively locked in position, if desired, by a cotter pin or other suitable means (not shown).

Further support for the mold board and rake assembly is provided by the push poles or beams 33. The rear extremity of each of these members is provided with pin-bearing reinforcements 48 (Fig. 6) welded to the top and bottom surfaces thereof. These reinforcements and the top and bottom flanges of each of the members 33 are bored in alignment to receive a pivot pin 49 having a handle 49a. The spacing of the top and bottom flanges of each of the members 33 is such that they may embrace either the respective frame side member 34 or the respective bracket member 35, which are of similar depth. When the mold board and rake assembly is adjusted to its head-on position, as illustrated in Figs. 1 and 2, the rear extremities of the push poles 33 are connected by the pins 49 to the respective frame side members 34, which are provided with properly located bores 34a (Fig. 5) for making such connections.

The forward extremities of the push poles 33 are connected to the respective end portions of the mold board 31 by means of yoke members 50 (Figs. 1, 2, 3, 4, 7), the forward portions 50a of which are of arcuate plate form, each fitting between a pair of similarly arcuate bracket plates 51 welded or otherwise rigidly secured to the rear surface of the mold board 31. Both the yoke portions 50a and the bracket plates 51 are bored to receive securing pins 52. The plates 51 have a plurality of openings 51a for receiving each of the associated securing pins 52, of which an upper and a lower one is provided in conjunction with each of the yoke members 50, the forward portions 50a of the latter being provided accordingly with an upper and a lower pin-receiving opening in each case. There are therefore an upper and a lower series of pin-receiving openings 51a through each of the pairs of bracket plates 51, each of the openings in each upper series being spaced from a corresponding opening in a lower series by the same arcuate distance as the spacing of the pin-receiving openings in the yoke portions 50a.

The arcuate formation of both the yoke portions 50a and the bracket plates 51 is centered about the axis of the spindle 43 so that when the assembly of the mold board and associated parts is to be adjusted about said axis the plates 51 are moved arcuately along the associated yoke portions 50a, which are supported by the push poles 33 in a manner about to be described. The pins 52 are, of course, removed when such an adjustment is to be made and are inserted in the properly aligned openings through the plates 51 and yoke portions 50a when the adjustment is completed. When the securing pins 52 are thus inserted they are locked in place by cotter pins 53.

Each of the yoke members 50 is formed at the rear thereof with spaced pin-receiving portions 50b (Figs. 3, 7, 10) which are bored in alignment with each other on an axis which, in the assembled structure, is substantially perpendicular to the general plane of the frame 23. The forward extremity of each of the push poles 33 has rigidly secured to the top and bottom surfaces thereof, by welding or other suitable means, pin-receiving extensions 54 which are likewise bored in alignment with each other and which are so spaced as to embrace the spaced pin-receiving portions 50b of the respective yoke member 50 (Figs. 2, 6, 7). A pin 55, provided with a handle 55a for ready replacement and removal, is inserted through the openings in the portions 54 and 50b, which are first brought into alignment, to form a hinged connection between each of the push poles 33 and the associated yoke member 50. This completes the connections of the mold board and associated parts assembly to the frame 23 for the head-on position of the assembly as illustrated in Figs. 1 and 2.

When the said assembly is to be adjusted to an angular position about the main pivot pin 32, as for purposes of side-casting, the pivot pins 49 connecting the two push poles 33 to the opposite sides of the frame 23 are removed, and the pin 55 connecting the forward extremity of the push pole to the yoke member 50 is also removed on the side of the assembly which is to be moved backwardly. This side of the assembly is then moved back to a position in which the yoke member 50 on this side comes into register with the corresponding bracket member 35 on the front corner of the frame 23. The inner surface spacing of the yoke portions 50b is such that these portions will fit over the bracket member 35, each of which latter is properly bored to receive one of the pivot pins 55 (or 49) in properly fitting relation. The yoke member 50 is thus pivotally connected by the pin 55 to the bracket member 35 on the side of the assembly which is rearwardly adjusted, and when this adjustment is made the push pole 33 on this side of the assembly is not used, this connection being illustrated in Figs. 5 (right side) and 10.

In this position of the parts the opposite side of the assembly is, of course, moved forwardly a distance equal to the rearward movement on the first-mentioned side and the rearward extremity of the push pole 33 on the said opposite side is then brought into such position that the pin-receiving openings in the rear end thereof are in alignment with the pin-receiving opening in the bracket 35 on the corresponding side of the frame. The associated pin 49 is then inserted through these aligned openings to complete the connection of the mold board and associated parts assembly to the frame in the side-casting adjustment above referred to, this connection being illustrated at the left side of Fig. 5. Since the push pole 33 in this instance is connected to the mold board in the same manner as in the head-on adjustment thereof, it is unnecessary to disconnect these parts on the side of the assembly which is moved forwardly.

When the mold board assembly is adjusted to an angled position to either side about the main pivot pin 32 the rake teeth 36 are adjusted through an equal angle in the opposite direction about their respective pivotal mountings on the mold board, so that these teeth are maintained in parallelism with the direction of movement of the implement. The pivotal mounting of the rake teeth is best shown in Figs. 3, 4, 5 and 9. For each tooth a pin-receiving bracket or sleeve 56 is rigidly secured, as by welding, to the rear surface of the mold board 31. The lower edge of the mold board is bent back and preferably reinforced with an additional thickness of material to form a rearwardly extending flange 31a of double thickness. The pin-receiving members 51 are mounted on the mold board with the axes of their bores extending, when the apparatus is fully assembled, substantially perpendicularly to the general plane of the frame 23, and the rearwardly extending flange 31a of the mold board is provided with pin-receiving openings in alignment with and of the same diameter as those in the members 56. The upper portion of each of the rake teeth 36 is formed with an upper pin-receiving portion 36a and a lower pin-receiving portion 36b spaced apart a sufficient distance to embrace the pin-receiving sleeve 56, and the tooth is pivotally mounted on the mold board by thus positioning it with the pin-receiving openings in the interfitting parts in alignment, and inserting a tooth pivot pin 57 through these aligned openings, as best shown in Fig. 9.

Each of the pins 57 is provided with a handle 57a for ready replacement and removal and is preferably held in place by an angle member or bracket 58 having an upwardly extending flange bolted to the back surface of the mold board 31 and a rearwardly extending flange overlying the upper end of the associated pin 57 and passing through the opening in the handle 57a. It is then necessary, of course, to remove the member 58 in order to permit removal of the associated pin 57 whenever the corresponding rake tooth is to be removed from the assembly for any reason. The forward edge of each tooth 36 is slotted as shown at 36c to clear the rearwardly extending flange 31a of the mold board, and the lower edge of the slot 36c is provided with a downwardly extending slot 36d to receive the lower extremity of the tooth pivot pin 57. The tooth is preferably reinforced around the region of these slots by means of plates 59 welded to the opposite sides thereof.

The rearward edge of each of the rake teeth 36 has rigidly secured thereto, as by welding, a rearwardly projecting plate or bracket member 60 having a pin-receiving opening therethrough on an axis parallel to that of the openings receiving the pin 57. The tooth-connecting bar 37 is of composite construction (Figs. 4, 8, 9), comprising a top plate member 37a, a bottom plate member 37b, and spacing members 37c welded in place therebetween to hold the plates in assembled, spaced relation. The spacing therebetween is such as to receive freely the tooth bracket members 60, and the plates are provided with pin-receiving openings on centers properly located for pivotal connection of the teeth thereto, whereby the teeth are maintained in parallelism with each other at all times. Such pivotal connections are made by means of pivot pins 61 held in place by cotter pins 62.

The spacing members 37c of the connecting bar 37 are coaxially positioned with the pin-receiving openings 40 and are bored in alignment therewith to provide additional bearing surfaces for the pivot pins 39. The yoke member 38 is provided with cylindrical spacing and thickening members 63 welded to the undersurface thereof in coaxial relation to the openings receiving the pins 39 and correspondingly bored for the reception of such pins, which are inserted therethrough and through the proper openings 40 in the connecting bar 37 to locate the rake teeth in desired angular adjustment with respect to the mold board 31. The pins 39 are retained in place by cotter pins 64. The rake teeth are held in position as thus adjusted by means of a forwardly extending portion 38a of the yoke member 38 which fits freely between the bracket or pin-bearing plate 47 secured to the back of the mold board 31, and a similarly formed and mounted plate 65 positioned below the plate 47. Both the forward yoke portion 38a and the pin-receiving plate 65 are bored in proper alignment to receive the pin 32, which therefore serves to anchor the yoke member 38 and the rake tooth assembly connected thereto, as well as providing the main pivotal mounting for the complete mold board and rake tooth assembly.

It will be understood, of course, that the pin holes 40 in the connecting bar 37 are so positioned as to come into alignment with the respective pin holes in the yoke member 38 when the rake teeth are swung into desired angular relation to the mold board, corresponding to the transverse angular relation of the mold board to the entire implement. Thus the rake teeth may be locked in parallelism with the direction of movement of the implement in each of the angular adjustments of the mold board. In Figs. 1 and 3, for example, the assembly is illustrated with the mold board in the head-on position, in which the rake teeth are adjusted to planes perpendicular to the general plane of the mold board, this being done by pinning the ends of the yoke member 38 to the connecting bar 37 through the middle one of each series of pin-receiving openings 40 in the connecting bar.

When the mold board assembly is angled to the right as illustrated in full lines in Fig. 5, the connecting bar 37 is shifted, as shown, to bring the left-hand opening 40 of each series of such openings into alignment with the corresponding pin-receiving opening in the yoke member 38, and the pins 39 are inserted through the openings thus aligned. In the opposite angled position of the mold board assembly, indicated in Fig. 5 by the dotted line illustration of the extremities only of said assembly, the connecting bar will, of course, be shifted to bring the right-hand opening 40 of each series into alignment with the corresponding pin-receiving opening in the yoke member 38, and the assembly will be pinned together in that relationship, in which the planes of the rake teeth 36 will again be parallel to the direction of movement of the implement. Provision is made, therefore, for obtaining this condition of parallelism in all adjusted positions of the mold board assembly.

The embodiment of the invention illustrated in Figs. 11–14 is generally similar to that described above except that means are provided for automatically maintaining the rake teeth in parallelism with the direction of movement of the implement as the mold board assembly is adjusted to its different angled positions about the main pivot pin, instead of requiring that the adjustment of the rake tooth assembly be made separately from that of the mold board. A frame generally designated by the reference character 71 comprises side members 72 and front members 73 and is substantially the same as the frame 23 of the first embodiment. It is adapted to be mounted on a tractor or the like in the same manner, and therefore this mounting requires no further illustration. A main pivot pin 74 is carried at the center of the front portion of the frame, and a mold board 75 is pivotally mounted thereon as before. Rake teeth 76 are similarly pivotally mounted on the back of the mold board and are similarly connected by a connecting bar 77 to maintain them in parallelism with each other.

Push poles or beams 78 of slightly modified construction are utilized in this embodiment, and the manner of utilization thereof is also somewhat modified. Instead of removing one or the other of the push poles when the mold board assembly is to be adjusted to one or the other of its angled positions and making a more direct connection of the mold board to the frame on the side of the mold board which is adjusted rearwardly, the push poles are used in all of the adjusted positions, as shown in Fig. 11. This is done by providing a plurality of pin-receiving openings in the frame 71, consisting of openings 72a and 72b in each of the side frame members 72 and an opening 73a in each of the front frame members 73. The rear extremity of each of the push poles 78 has a corresponding pin-receiving opening whereby these ends of the push poles may be pinned to the frame 71 by means of pins 79, and the webs of said push poles are cut away as shown at 78a to clear the frame when connection is made to the front members 73 thereof. For purposes of simplicity in this form of construction the forward extremity of each of the push poles 78 is directly pivotally connected to the mold board 75, this being accomplished by means of pin-receiving extensions 80 secured to the top and bottom surfaces of the front extremity of each push pole to fit over pin-receiving lugs or brackets 81 secured to the rear surface of the mold board 75, and a cooperating pivot pin 82.

As shown in full lines in Fig. 11, the mold board assembly is secured in its head-on position by pinning the rear extremities of the push poles 78 to the respective frame side members through the pin-receiving openings 72a therein. When the mold board is to be angled to the right, as shown in dotted lines in Fig. 11, the left-hand push pole 78 is moved forwardly and pinned at its rear end to the front frame member 73 through the pin-receiving opening 73a therein, and the push pole 78 at the right is moved rearwardly and pinned at its rear extremity to the frame side member 72 through the rearmost pin-receiving opening 72b therein. The reverse angled adjustment is shown in dot-and-dash lines in Fig. 11 and is effected by reversing the push pole connections just described. These adjustments, of course, involve pivoting of the entire mold board assembly about the main pivot pin 74 as described in connection with the first embodiment of the invention with reference to the main pivot pin 32.

The rake teeth 76 are automatically adjusted by being caused to move pivotally about their respective axes through angles substantially equal but opposite to the angle of adjustment of the entire assembly. This automatic rake tooth adjustment is provided by connecting the ends of the connecting bar 77 to the respective adjacent push poles 78 by means of links 83.

The outer end of each of the links 83 is pivotally connected to the respective push pole 78 by means of a pivot bolt 84 carried by said push pole near the forward extremity thereof. A spacing member 85 is welded to the bottom surface of the extension member 80 along a portion of the length thereof which is welded or otherwise secured to the bottom of the push pole 78, and a bracket member 86 is welded to the bottom of the downwardly and forwardly extended end portion of the extension member 80 and extends rearwardly therefrom to underlie the spacing member 85 in spaced relation thereto. The lower flange of the push pole 78 and the parts 80, 85 and 86 are bored in alignment with each other to receive and support the pivot bolt 84. The link 83 is received in freely movable relation between the spaced surfaces of the spacing member 85 and the bracket member 86 and is pivotally connected to the push pole 78 by means of the bolt 84 passing through an opening 83a in said link. The diameter of the opening 83a is somewhat larger than that of the bolt 84 to produce ample freeness in the pivotal connection at this point.

Each of the links 83 has its inner end pivotally connected to the adjacent extremity of the connecting bar 77, which is of composite construction similar to that of the connecting bar 37 previously described. This composite construction consists of spaced upper and lower plate members 77a and 77b, respectively, and spacing members 77c welded therebetween. This construction does not embody a yoke member such as the member 38 of the first embodiment, and therefore the plate members 77a and 77b and the spacing members 77c are not bored to receive connecting pins as in the case of the previously described members 37a, 37b and 37c. Otherwise, however, the structure of the connecting bar is substantially the same as previously described.

A bracket member 87 is welded to the upper surface of the top plate portion 77a of the bar 77 a short distance inwardly from each end thereof. Each of the members 87 extends upwardly and outwardly from the inner extremity thereof, which is secured to the bar 77, and overlies the adjacent extremity of said bar in upwardly spaced relation thereto. The end portion of the bar which it overlies includes the pin-receiving opening for the pin which pivotally connects the rake tooth at that end of the assembly to the bar 77.

The member 87 is bored in alignment with that opening to receive a pivot pin 88 for making this connection, this pin being longer than those for the intermediate rake teeth in order to extend through and beyond the thicker structure at this point.

The inner end of the link 83 is freely received between the upper surface of the bar 77 and the overlying bracket member 87 and has an opening 83b therein through which the pin 88 extends to provide the pivotal connection between these members as well as that between the corresponding end rake tooth 76 and the bar 77. This latter connection is made by means of a rearwardly extending lug 89 welded to the back of the said tooth 76 and extending between the plate portions 77a and 77b of the bar 77, as in the previously described embodiment. The pin 88 is retained in this connection by means of a cotter pin 90.

The fit between the bore 83b in the link 83 and the pivot pin 88 is, like that between the opening 83a and the pivot bolt 84, relatively loose although not necessarily to the extent shown, thus assuring free working of the parts. This looseness also provides a desired latitude in the positioning of the holes in the frame 71 for the attachment of the rear ends of the push poles 78. This latitude is particularly desirable in the case of the holes 73a in the front frame portions 73, since it would otherwise be necessary to locate these holes closer to the center of the frame, where the push holes would not function so effectively or be so easy to attach. It will be understood, however, that the link connection between each end of the connecting bar 77 and the adjacent push pole 78 is sufficiently positive in its action to bring the rake teeth 76 into substantial parallelism with the direction of movement of the implement in each of the angular adjustments of the mold board 75 about the main pivot pin 74, three such positions of the parts being illustrated in Fig. 11 as previously noted. Thus the rake teeth are automatically positioned as desired with each adjustment of the mold board, and there is no separate adjustment to be made for properly positioning the rake teeth.

The provision of two of the links 83 is not essential, and either of them may be omitted if desired, in which case the remaining one will function in the same manner as described above to effect the desired automatic positioning of the rake teeth in all adjustments of the mold board. In some cases both of these links may be omitted and the rake teeth allowed to position themselves automatically on their pivotal mountings as they are forced through the earth or other material being operated upon, the several teeth being preferably connected to each other in all cases, however, by a connecting bar as disclosed herein to maintain them in parallelism with each other at all times. In case both of the links 83 are dispensed with, the mold board and rake assembly is free to be pivotally adjusted about the longitudinal axis of the implement in the same manner as illustrated in and described with reference to Fig. 4, and similar adjustable connections between the push poles and the mold board may be provided to accommodate such adjustments. The same adjustment is possible when either one or two of the links 83 are utilized, in which case corresponding arcuately adjustable connections may be made between said links and either of the members connected thereby.

In any case, of course, any desired number of the rake teeth may be provided, and it will be obvious that the implement may be designed and constructed for attachment to any type of tractor or other propelling vehicle. It is well adapted for various uses, the rake teeth serving to remove rocks and roots, to break up shale, etc. Moreover, the construction has the advantage that the mold board and rake assembly may be readily detached from the frame of the implement and replaced by other types of blades or the like if desired, and any or all of the rake teeth may be removed from the mold board whenever it may be desired to use the latter with a lesser number or none of the teeth attached thereto.

It will be seen from the foregoing that the present invention provides new and useful structures and combinations of elements which accomplish the hereinbefore-indicated objects in a highly advantageous manner. While only certain preferred embodiments of the invention have been specifically illustrated and described herein, it will be understood by those skilled in the art that various changes and modifications may be made therein without departing from the spirit and scope of the invention as set forth in the appended claims.

What is claimed is new and is desired to secure by Letters Patent, therefore, is:

1. An earth-working implement comprising an assembly including a mold board and a rake tooth extending downwardly therefrom; means for adjustably mounting said assembly on a tractor or the like, and means for selectively securing said assembly in a plurality of adjusted positions extending transversely to the longitudinal axis of the tractor in different angular relations thereto, said assembly further comprising means for mounting said tooth for pivotal movement about an axis which is fixed with respect to said mold board and is substantially perpendicular to the ground surface when the mold board is in a normal working position relative thereto.

2. An earth-working implement comprising an assembly including a mold board and a rake tooth extending downwardly therefrom; means for adjustably mounting said assembly on a tractor or the like, and means for selectively securing said assembly in a plurality of adjusted positions extending transversely to the longitudinal axis of the tractor in different angular relations thereto, said assembly further comprising means for mounting said tooth for pivotal movement about an axis which is fixed with respect to said mold board and is substantially perpendicular to the ground surface when the mold board is in a normal working position relative thereto, and means for securing said tooth in a plane substantially parallel to the longitudinal axis of the tractor in each of the adjusted positions of said mold board.

3. An earth-working implement comprising an assembly including a mold board and a plurality of rake teeth extending downwardly therefrom, means for adjustably mounting said assembly on a tractor or the like, and means for selectively securing said assembly in a plurality of adjusted positions extending transversely to the longitudinal axis of the tractor in different angular relations thereto, said assembly further comprising means for mounting each of said teeth for pivotal movement about an axis which is fixed with respect to said mold board and is substantially perpendicular to the ground surface when the mold board is in a normal working position relative thereto, and means connecting said teeth and maintaining them in substantially parallel relation to each other.

4. An earth-working implement comprising an assembly including a mold board and a plurality of rake teeth extending downwardly therefrom, means for adjustably mounting said assembly on a tractor or the like, and means for selectively securing said assembly in a plurality of adjusted positions extending transversely to the longitudinal axis of the tractor in different angular relations thereto, said assembly further comprising means for mounting each of said teeth for pivotal movement about an axis which is fixed with respect to said mold board and is substantially perpendicular to the ground surface when the mold board is in a normal working position relative thereto, and a connecting bar pivotally connected to each of said teeth and maintaining them in substantially parallel relation to each other.

5. An earth-working implement comprising an assembly including a mold board and a plurality of rake teeth extending downwardly therefrom, means for adjustably mounting said assembly on a tractor or the like, and means for selectively securing said assembly in a plurality of adjusted positions extending transversely to the longitudinal axis of the tractor in different angular relations thereto, said assembly further comprising means for mounting each of said teeth for pivotal movement about an axis which is fixed with respect to said mold board and is substantially perpendicular to the ground surface when the mold board is in a normal working position relative thereto, means connecting said teeth and maintaining them in substantially parallel relation to each other, and means for anchoring said connecting means in position to maintain said teeth in planes substantially parallel to the longitudinal axis of the tractor in each of the adjusted positions of said assembly.

6. An earth-working implement comprising an assembly including a mold board and a plurality of rake teeth extending downwardly therefrom, means for adjustably mounting said assembly on a tractor or the like, and means for selectively securing said assembly in a plurality of adjusted positions extending transversely to the longitudinal axis of the tractor in different angular relations thereto, said assembly further comprising means for mounting each of said teeth for pivotal movement about an axis which is fixed with respect to said mold board and is substantially perpendicular to the ground surface when the mold board is in a normal working position relative thereto, means connecting said teeth and maintaining them in substantially parallel relation to each other, and means for anchoring said connecting means in position to maintain said teeth in planes substantially parallel to the longitudinal axis of the tractor in each of the adjusted positions of said assembly, said anchoring means comprising a yoke member and means for securing the same to said mold board and said connecting means in different operative relative positions thereof.

7. An earth-working implement comprising an assembly including a mold board and a plurality of rake teeth extending downwardly therefrom, means for adjustably mounting said assembly on a tractor or the like, and means for selectively securing said assembly in a plurality of adjusted positions extending transversely to the longitudinal axis of the tractor in different angular relations thereto, said assembly further comprising means for mounting each of said teeth for pivotal movement about an axis which is fixed with respect to said mold board and is substantially perpendicular to the ground surface when the mold board is in a normal working position relative thereto, means connecting said teeth and maintaining them in substantially parallel relation to each other, and means for anchoring said connecting means in position to maintain said teeth in planes substantially parallel to the longitudinal axis of the tractor in each of the adjusted positions of said assembly, said anchoring means comprising a yoke member, means for securing said yoke member to said mold board and means for securing said yoke member to said connecting means in different operative positions of the latter relative to said mold board.

8. An earth-working implement comprising a frame, means for mounting said frame on a tractor or the like, an assembly including a mold board and a plurality of rake teeth extending downwardly therefrom, means for mounting said assembly on said frame for pivotal adjustment thereon about an axis which is substantially perpendicular to the ground surface when the mold board is in a normal working position relative thereto, and means for selectively securing said assembly in a plurality of positions as thus adjusted, said assembly further comprising means for mounting each of said teeth for pivotal movement about an axis fixed with respect to said mold board and substantially parallel to that of the pivotal mounting of said assembly on said frame, means connecting said teeth and maintaining them in substantially parallel relation to each other, and means for anchoring said connecting means in position to maintain said teeth in planes substantially parallel to the longitudinal axis of the tractor in each of the adjusted positions of said assembly, said anchoring means comprising a yoke member secured to the pivotal mounting means for said assembly and means for securing said yoke member to said connecting means in different operative positions of the latter relative to said mold board.

9. An earth-working implement comprising an assembly including a mold board and a plurality of rake teeth extending downwardly therefrom, means for adjustably mounting said assembly on a tractor or the like, and means for selectively securing said assembly in a plurality of adjusted positions extending transversely to the longitudinal axis of the tractor in different angular relations thereto, said assembly further comprising means for mounting each of said teeth for pivotal movement about an axis which is fixed with respect to said mold board and is substantially perpendicular to the ground surface when the mold board is in a normal working position relative thereto, means connecting said teeth and maintaining them in substantially parallel relation to each other, and linkage means for positioning said connecting means to maintain said teeth in planes substantially parallel to the longitudinal axis of the tractor in each of the adjusted positions of said assembly.

10. An earth-working implement comprising an assembly including a mold board and a plurality of rake teeth extending downwardly therefrom, means for adjustably mounting said assembly on a tractor or the like, and means for selectively securing said assembly in a plurality of adjusted positions extending transversely to the longitudinal axis of the tractor in different angular relations thereto, said assembly further comprising means for mounting each of said teeth for pivotal movement about an axis which is fixed with respect to said mold board and is substantially perpendicular to the ground surface when the mold board is in a normal working position relative thereto, means connecting said teeth and maintaining them in substantially parallel relation to each other, and linkage means associated with said selective securing means for positioning said connecting means to maintain said teeth in planes substantially parallel to the longitudinal axis of the tractor in each of the adjusted positions of said assembly.

11. An earth-working implement comprising a mold board, means for adjustably mounting said mold board on a tractor or the like, means for selectively securing said mold board in a plurality of adjusted positions extending transversely to the longitudinal axis of the tractor in different angular relations thereto, a plurality of rake teeth carried by said mold board and extending downwardly therefrom, means for mounting each of said teeth for pivotal movement relative to said mold board about an axis which is substantially perpendicular to the ground surface when the mold board is in a normal working position relative thereto, means connecting said teeth and maintaining them in substantially parallel relation to each other, and linkage means pivotally connected to said selective securing means and to said connecting means for positioning the latter to maintain said teeth in planes substantially parallel to the longitudinal axis of the tractor in each of the adjusted positions of said mold board.

12. An earth-working implement comprising a mold board, means for adjustably mounting said mold board on a tractor or the like, means comprising a push pole selectively supported by the tractor in a plurality of positions and pivotally connected to said mold board for selectively securing the latter in a plurality of adjusted positions extending transversely to the longitudinal axis of the tractor in different angular relations thereto, a plurality of rake teeth carried by said mold board and extending downwardly therefrom, means for mounting each of said teeth for pivotal movement relative to said mold board about an axis which is substantially perpendicular to the ground surface when the mold board is in a normal working position relative thereto, means connecting said teeth and maintaining them in substantially parallel relation to each other, and a link pivotally connected to said push pole and to said connecting means for positioning the latter to maintain said teeth in planes substantially parallel to the longitudinal axis of the tractor in each of the adjusted positions of said mold board.

13. An earth-working implement comprising a mold board, means for adjustably mounting said mold board on a tractor or the like, means comprising a push pole selectively supported by the tractor in a plurality of positions and pivotally connected to said mold board for selectively securing the latter in a plurality of adjusted positions extending transversely to the longitudinal axis of the tractor in different angular relations thereto, a plurality of rake teeth carried by said mold board and extending downwardly therefrom, means for mounting each of said teeth for pivotal movement relative to said mold board about an axis which is substantially perpendicular to the ground surface when the mold board is in a normal working position relative thereto, a connecting bar pivotally connected to each of said teeth and maintaining them in substantially parallel relation to each other, and a link pivotally connected to said push pole and to said connecting bar for positioning the latter to maintain said teeth in planes substantially parallel to the longitudinal axis of the tractor in each of the adjusted positions of said mold board.

14. An earth-working implement comprising a frame, means for mounting said frame on a tractor or the like, a mold board, means for mounting said mold board on said frame for pivotal adjustment thereon about an axis which is substantially perpendicular to the ground surface when the mold board is in a normal working position relative thereto, means comprising a push pole having one of its ends selectively connected to said frame at a plurality of points thereon and having its other end pivotally connected to said mold board for selectively securing the latter in a plurality of positions adjusted about said axis, a plurality of rake teeth carried by said mold board and extending downwardly therefrom, means for mounting each of said teeth for pivotal movement relative to said mold board about an axis substantially parallel to that of the pivotal mounting of said mold board on said frame, means connecting said teeth and maintaining them in substantially parallel relation to each other, and a link having one of its ends pivotally connected to said push pole and having its other end pivotally connected to said connecting means for positioning the latter to maintain said teeth in planes substantially parallel to the longitudinal axis of the tractor in each of the adjusted positions of said mold board.

15. An earth-working implement comprising a frame, means for mounting said frame on a tractor or the like, a mold board, means for mounting said mold board on said frame for pivotal adjustment thereon about an axis which is substantially perpendicular to the ground surface when the mold board is in a normal working position relative thereto, means comprising a pair of push poles associated with opposite sides of said frame and each having one of its ends selectively connected to the corresponding side of said frame at a plurality of points thereon and having its other end pivotally connected to said mold board at a point adjacent the corresponding end thereof for selectively securing the latter in a plurality of positions adjusted about said axis, a plurality of rake teeth carried by said mold board and extending downwardly therefrom, means for mounting each of said teeth for pivotal movement relative to said mold board about an axis substantially parallel to that of the pivotal mounting of said mold board on said frame, means connecting said teeth and maintaining them in substantially parallel relation to each other, and a pair of links respectively associated with said push poles and each having one of its ends pivotally connected to the corresponding push pole and having its other end pivotally connected to said connecting means for positioning the latter to maintain said teeth in planes substantially parallel to the longitudinal axis of the tractor in each of the adjusted positions of said mold board.

16. An earth-working implement comprising an assembly including a mold board and a rake tooth extending downwardly therefrom, means for adjustably mounting said assembly on a tractor or the like, and means for selectively securing said assembly in a plurality of adjusted positions extending transversely to the longitudinal axis of the tractor in different angular relations thereto, said assembly further comprising means for mounting said tooth for pivotal movement about an axis which is fixed with respect to said mold board and is substantially perpendicular to the ground surface when the mold board is in a normal working position relative thereto, and linkage means for positioning said tooth to maintain the same in a plane substantially parallel to the longitudinal axis of the tractor in each of the adjusted positions of said assembly.

17. An earth-working implement comprising an assembly including a mold board and a rake tooth extending downwardly therefrom, means for adjustably mounting said assembly on a tractor or the like, and means for selectively securing said assembly in a plurality of adjusted positions extending transversely to the longitudinal axis of the tractor in different angular relations thereto, said assembly further comprising means for mounting said tooth for pivotal movement about an axis which is fixed with respect to said mold board and is substantially perpendicular to the ground surface when the mold board is in a normal working position relative thereto, and linkage means associated with said selective securing means for positioning said tooth to maintain the same in a plane substantially parallel to the longitudinal axis of the tractor in each of the adjusted positions of said assembly.

18. An earth-working implement comprising a mold board, means for adjustably mounting said mold board on a tractor or the like, means for selectively securing said mold board in a plurality of adjusted positions extending transversely to the longitudinal axis of the tractor in different angular relations thereto, a rake tooth carried by said mold board and extending downwardly therefrom, means for mounting said tooth for pivotal movement relative to said mold board about an axis which is substantially perpendicular to the ground surface when the mold board is in a normal working position relative thereto, and linkage means pivotally connected to said selective securing means and to said tooth for positioning the latter to maintain it in a plane substantially parallel to the longitudinal axis of the tractor in each of the adjusted positions of said mold board.

19. An earth moving implement comprising a tooth mounting, means for adjustably securing said tooth mounting on a tractor or the like, push pole means supported by the tractor in a plurality of positions and pivotally connected to said tooth mounting for selectively securing the lattter in a plurality of adjusted positions, a rake tooth carried by said tooth mounting and extending downwardly therefrom when said tooth mounting is in a normal working position relative to the ground surface, a link member pivotally connected to said push pole and to said tooth for positioning the latter to mainain substantial parallelism to the longitudinal axis of the tractor in each of the adjusted positions.

ELLSWORTH W. AUSTIN.

REFERENCES CITED

The following references are of record in the file of this patent:

UNITED STATES PATENTS

| Number | Name | Date |
|---|---|---|
| 2,081,192 | Allin et al. | May 25, 1937 |
| 1,173,539 | Rogers | Feb. 29, 1916 |